United States Patent
Wang et al.

(10) Patent No.: US 10,848,030 B2
(45) Date of Patent: Nov. 24, 2020

(54) MOTOR SLOT WEDGE WITH SEALING STRUCTURE AND COMBINATION DEVICE

(71) Applicant: XINJIANG GOLDWIND SCIENCE & TECHNOLOGY CO., LTD., Xinjiang (CN)

(72) Inventors: Dong Wang, Xinjiang (CN); Shengjun Ma, Xinjiang (CN); Chengqian Liu, Xinjiang (CN); Xiang Zhao, Xinjiang (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 582 days.

(21) Appl. No.: 15/516,835

(22) PCT Filed: Dec. 17, 2014

(86) PCT No.: PCT/CN2014/094123
§ 371 (c)(1),
(2) Date: Apr. 4, 2017

(87) PCT Pub. No.: WO2016/054862
PCT Pub. Date: Apr. 14, 2016

(65) Prior Publication Data
US 2017/0310186 A1 Oct. 26, 2017

(30) Foreign Application Priority Data
Oct. 11, 2014 (CN) .......................... 2014 1 0536606

(51) Int. Cl.
*H02K 3/48* (2006.01)
*H02K 1/16* (2006.01)
(Continued)

(52) U.S. Cl.
CPC ............... *H02K 3/487* (2013.01); *H02K 1/16* (2013.01); *H02K 1/26* (2013.01)

(58) Field of Classification Search
CPC .......... H02K 3/487; H02K 3/493; H02K 1/16; H02K 1/26; H02K 1/165; H02K 1/265; H02K 15/125
(Continued)

(56) References Cited

U.S. PATENT DOCUMENTS

| 2,990,487 A | 6/1961 | Stigler et al. |
| 5,598,049 A | 1/1997 | Meier |

(Continued)

FOREIGN PATENT DOCUMENTS

| CN | 1102914 A | 5/1995 |
| CN | 101867235 A | 10/2010 |

(Continued)

OTHER PUBLICATIONS

Igarashi (WO 0016466 A1) English Translation (Year: 2000).*
(Continued)

*Primary Examiner* — Tulsidas C Patel
*Assistant Examiner* — Robert E Mates

(57) ABSTRACT

A motor slot wedge having a sealing structure is provided. An outer wall of the slot wedge is provided with a groove, and a thermal expansion material is provided in the groove, and the thermal expansion material, after expanding with heat, is in contact with an inner wall of an iron core tooth slot. A combination structure of a motor slot wedge having a sealing structure and a motor iron core is further provided, and includes the motor iron core having an iron core tooth slot and the motor slot wedge. A sealing structure is formed between the slot wedge and the inner wall of the slot of the iron core, thereby preventing the moisture from entering the inside of the slot of the iron core and damaging the insula-
(Continued)

tion structure accordingly, and preventing varnish loss after varnish vacuum pressure impregnation.

17 Claims, 17 Drawing Sheets

(51) Int. Cl.
*H02K 1/26* (2006.01)
*H02K 3/487* (2006.01)

(58) Field of Classification Search
USPC .................................................. 310/214, 215
See application file for complete search history.

(56) References Cited

U.S. PATENT DOCUMENTS

| | | | | |
|---|---|---|---|---|
| 2004/0012294 | A1* | 1/2004 | Rippel | H02K 1/20 310/60 A |
| 2008/0249236 | A1* | 10/2008 | Nakashima | C03C 27/10 524/577 |

FOREIGN PATENT DOCUMENTS

| | | | |
|---|---|---|---|
| CN | 102611227 A | 7/2012 | |
| CN | 202309299 U | 7/2012 | |
| CN | 204145132 U | 2/2015 | |
| DE | 3241410 A1 | 12/1983 | |
| JP | 55109149 A * | 8/1980 | |
| JP | 55109149 A | 8/1980 | |
| JP | 5612828 A | 2/1981 | |
| JP | 5638950 A | 4/1981 | |
| JP | 59080129 A * | 5/1984 | ............ H02K 3/493 |
| JP | 2006-109600 A | 4/2006 | |
| JP | 2014-158316 A | 8/2014 | |
| WO | 0016466 A1 | 3/2000 | |
| WO | WO-0016466 A1 * | 3/2000 | ............ H02K 3/487 |
| WO | 2014/108276 A2 | 7/2014 | |

OTHER PUBLICATIONS

Igarashi (WO 0016466 A1) Partial English Translation (Year: 2000).*
Itotsuki (JP 55109149 A) English Translation (Year: 1980).*
Kato (JP 59080129 A) English Translation (Year: 1984).*
International Search Report dated Jun. 17, 2015; PCT/CN2014/094123.
The First Chinese Office Action dated May 20, 2015; Appln. No. 201410536606.7.
The Second Chinese Office Action dated Jul. 28, 2015; Appln. No. 201410536606.7.
The Second Korean Office Action dated Sep. 3, 2018; Appln. No. 10-2017-7011717.
R.J. Arenz, et al; "Relation of Elastic Modulus to Thermal Expansion Coefficient in Elastic and Viscoelastic Materials" Jan. 2005, 4 pages, Jesuit Community, Loyola Marymount University, Los Angeles CA 90045.
Doo Jin Lee, et al; "Thermomechanical Anisotropy and Flowability of Talc and Glass Fiber Reinforced Multiphase Polymer Composites", Composite Structures, vol. 174, Jan. 1, 2015; pp. 329-337 XP055466812.
Extended European Search Report dated Apr. 26, 2018; Appln. No. 14903551.1.
The First Korean Office Action dated Apr. 2, 2018; Appln. No. 10-2017-7011717.

* cited by examiner

MOTOR SLOT WEDGE WITH SEALING STRUCTURE AND COMBINATION DEVICE

FIELD

The present application relates to a motor slot wedge, and particularly to a motor slot wedge having a sealing structure and a combination device of a motor iron core and the motor slot wedge.

BACKGROUND

1. Description of an Insulation Structure and a Slot Sedge Structure of a Motor

In the process of producing a motor, it is required to provide slots in an iron core of a stator or a rotor, and arrange coils in the slots, and then mount slot wedges of various shapes in slot openings of the slots to fix the coils in the slots. The motor, as a power generation device, requires to provide a good insulation for winding coils and surrounding structures. An insulation structure of an iron core tooth slot in the conventional technology is as shown in FIGS. 1 to 3, where several common shapes of the slot wedge are also shown. The insulation structure of the motor winding slot mainly includes: a slot wedge 1, a slot insulator 2, an inter-turn insulator 3, an interlayer insulator 4, a protection insulator 5, a grounding insulator 6 and a slot bottom filler strip 7. The slot insulator 2 generally employs a composite material such as DMDM (a polyester film) or DMD (a polyester fiber)). The slot wedge 1 in FIG. 1 has a sector-shaped cross section, the slot wedge 1 in FIG. 3 has a hexagonal cross section, and the slot wedge 1 in FIG. 5 has a trapezoidal shaped cross section. FIGS. 2, 4, and 6 are partially enlarged views of FIGS. 1, 3 and 5 respectively, showing contact states of the above several kinds of slot wedges 1 with an inner wall of the iron core tooth slot, it may be seen that there is a gap between the slot wedges 1 and the inner wall of the iron core tooth slot.

2. Description of the Technique of Varnished Impregnation Insulation Treatment and Existing Defects In the process of manufacturing a motor, the winding itself also requires a strict insulation treatment to improve mechanical, electrical and other protection properties. The varnish impregnation treatment is a key procedure in manufacturing the motor. The varnish impregnation treatment refers to treatment procedures of impregnating and filling an inner layer and covering a surface with an insulation varnish. The winding insulation treatment has following purposes. 1) To improve a moisture resistance, the insulation may absorb moisture in a humid air to varying degrees, resulting in deterioration of insulation performance, the insulation structure, after being impregnated with varnish, dried and solidified, may fill pores and a smooth and form a smooth and dense varnish film on the surface, which may improve the capability of preventing the moisture and other mediums from intruding. 2) To retard the degree of aging, improve heat conducting performance and heat dissipation effect, therefore, may retard the aging process, thereby prolonging a service life of the insulation structure. The thermal conductivity of the insulation varnish is about five times that of air, after air gaps in the insulation structure are filled by the insulation varnish, the heat conducting performance of the insulation structure can be improved, and the heat dissipation effect thereof can be improved. 3) To improve the electrical performance and the mechanical performance. The insulation strength and other electrical performances of the insulation varnish are far superior to those of air, after the insulation treatment, the winding is bonded into an integral body, which not only improves the electrical performance of the winding, but also avoids insulation loosening and abrasion caused by an electromagnetic force, vibration and heat-expansion and cold-contraction. 4) To improve the chemical stability. After the insulation treatment, the varnish film can prevent the insulation material from contacting detrimental chemical mediums and damaging the insulation performance accordingly. However, there are lots of intrinsic contradictions in the varnish vacuum pressure impregnation process. The viscosity of the varnish is related to the amount of its solvent, the more is the solvent and the less is the solid content, the lower is the viscosity of the varnish. If the varnish with a low viscosity is used, though the varnish may have a high penetration capacity and can be well penetrated into the gaps between various layers of insulation material around the winding as well as gaps between the insulation material and an iron core tooth slot, many gaps remain after the solvent is volatilized since the content of varnish base is less, such that the moisture resistance capability, the heat conducting capability, the mechanical strength and the insulation strength are all adversely affected. If the varnish used has a too high viscosity, it will be difficult for the varnish to impregnate into the inside of the winding, namely, the phenomenon of poor impregnation may occur, thus the moisture proof capability, the heat conducting capability, the mechanical strength and the electric strength cannot meet the requirements either.

Currently, motors produced by Chinese domestic motor factories generally employ a secondary varnish impregnation. A thermal immersion technique is employed, the number of drying times is two. The process of the varnish impregnation consists of pre-drying, a first time of varnish impregnating, varnish trickling, a first time of drying, a second time of varnish impregnating, varnish trickling, and a second time of drying. When performing the first time of varnish impregnating, in order to allow the varnish to be well filled into the inside of the winding, the varnish impregnating should be lasted for a longer time. The second time of varnish impregnating is mainly for forming a surface varnish film, and does not require a long time. From another aspect, if the second time of varnish impregnating is lasted for a too long time, the varnish film formed in the first time of varnish impregnating may be damaged instead, and a good varnish impregnating effect cannot be obtained. Thus, a contradiction is presented between the time dimensions in the two times of varnish trickling processes. Not only the amount of varnish loss is adversely affected, but also the amount of varnish adhered to an inner peripheral surface and an outer peripheral surface of the iron core in the secondary varnish impregnation is further adversely affected. If the amount of varnish adhered to the iron core is small, scraping of varnish may be omitted, however, the varnish loss may inevitably cause gaps to be presented between the insulations in the slot, thus resulting in potential safety hazards of water entering, moisture absorbing and insulation damaging.

The conventional slot wedge structures don't take effective sealing measures, which though facilitates entering of varnish, cannot prevent varnish loss in varnish trickling.

3. Insulation Defects Caused by Hygrothermal Expansion of Porous Mediums of a Conventional Slot Wedges and Slot Insulator.

The composite material employed by a conventional slot wedge consists of fibers and a substrate. Since the fibers and the substrate have different thermal expansion properties, an unidirectional fiber reinforced composite material also has anisotropy in the thermal expansion property aspect (the mechanical behavior is anisotropic). In addition, the resin substrate is generally apt to absorb moisture in a humid environment, while the fibers generally has a poor moisture absorbing performance. The composite material is deformed after absorbing moisture, and since the fibers and the substrate have different moisture absorbing capabilities, the moisture deformation of the composite material also has anisotropy.

Since the fracture strain of the fibers is greater than the fracture strain of the substrate, after the material of the substrate fractures, the fibers continue to be elongated, moreover the fracturing of the substrate causes unloading of the substrate, and the substrate has a small deformation. Thus, interface de-bonding is caused due to greatly increased shear stress between the fibers and the substrate, thus causing de-bonding of the conventional slot wedge from the silicone steel sheet at the iron core tooth slot opening. Water and moisture flows into the slot along a crack generated by the de-bonding.

The porous medium material of the slot insulator is required to be solidification-treated at a high temperature when being composited, thus a residual stress may be presented in a wind turbine at a low temperature. When the material is fully constrained, partially constrained, or is heated or cooled unevenly, the material cannot or cannot fully expanded and contracted freely, thus a thermal stress may be generated in the material; and after the material absorbs moisture or is heated to remove the moisture, a moisture stress may also be generated, that is, a hygrothermal effect of composite materials.

4. Defect Analysis of the Conventional Slot Wedges

It may be seen from the related contents of the above points 1 to 3, the varnish impregnation treatment process, the physical and chemical reactions in a moisture environment and the structural properties of the conventional wedge itself may have great influences on the insulation structure of the slot portion of the motor. The defects of the conventional wedge structures mainly lie in the following aspects.

1) The intrinsic contradiction exhibited in the varnish vacuum pressure impregnation process has shown that the conventional slot wedge structure, though facilitating entering of the varnish, cannot restrict the varnish from flowing away along the conventional slot wedge in varnish trickling after the first time of impregnating.

2) In the conventional technology, when a coil in a slot is fixed by using a slot wedge, since tooth stacking sheets at an iron core tooth slot opening are made of a material different from the material of the slot wedge, and there is a big difference between their elastic moduli, a "de-bonding" phenomenon may occur in the bonded interface formed between a free end of the conventional slot wedge and the tooth stacking sheets at the iron core tooth slot opening by means of insulation varnish (or adhesive), and the moisture and water may naturally enter the slot to damage the insulation, and even a phenomenon of runoff of a damaged medium (in a liquid state) may occur.

3) In the conventional technology, magnetic permeability materials are also used to manufacture the slot wedges, so as to exert a magnetic permeability function of the slot wedges. With the magnetic permeability slot wedges, the conventional slot wedges have an increased magnetic permeability capability, the magnetic flux distribution in the slot is even, the motor loss is reduced, and the motor efficiency is improved. However, this kind of technology can not ensure that the bonding layers of the slot wedge and the iron core tooth slot can be firmly bonded at the interface, and cannot restrict the moisture and water from entering the slot naturally along the crack between the bonding layers to damage the insulation. Further, in the case that this technology is used in wind-driven generator in a natural environment, lots of floccules and iron magnetic substances may be presented around the surface of the material of the magnetic permeability slot wedge, which may even block the air gap and damage the insulation between the stator and the rotor.

SUMMARY

A motor slot wedge having a sealing structure and a combination structure of a motor iron core and the slot wedge are provided according to embodiments of the present application, to allow a sealing structure to be formed between a slot wedge and an inner wall of a slot of an iron core, to prevent moisture from entering the inside of the slot of the iron core and damaging the insulation structure accordingly, and to prevent losing of varnish after varnish vacuum pressure impregnation.

To achieve the above object, a motor slot wedge having a sealing structure is provided according to an embodiment of the present application. An outer wall of the slot wedge is provided with a groove, and a thermal expansion material is provided in the groove, and the thermal expansion material, after expanding with heat, is in contact with an inner wall of an iron core tooth slot.

A combination structure of a motor slot wedge having a sealing structure and a motor iron core is further provided according to an embodiment of the present application, which includes a motor iron core having an iron core tooth slot and the motor slot wedge described above.

In the technical solution of the present application, by providing the groove in the outer wall of the slot wedge and filling the thermal expansion material or arranging a thermal expansion material directly at the bottom of the slot wedge along an outer wall of an axial part of the motor, a sealing structure is formed between the slot wedge and the inner wall of the slot of the iron core, thereby preventing the moisture from entering the inside of the slot of the iron core and damaging the insulation structure accordingly, and preventing varnish loss after varnish vacuum pressure impregnation.

EXPLANATION TO REFERENCE NUMERALS

Figure 1:
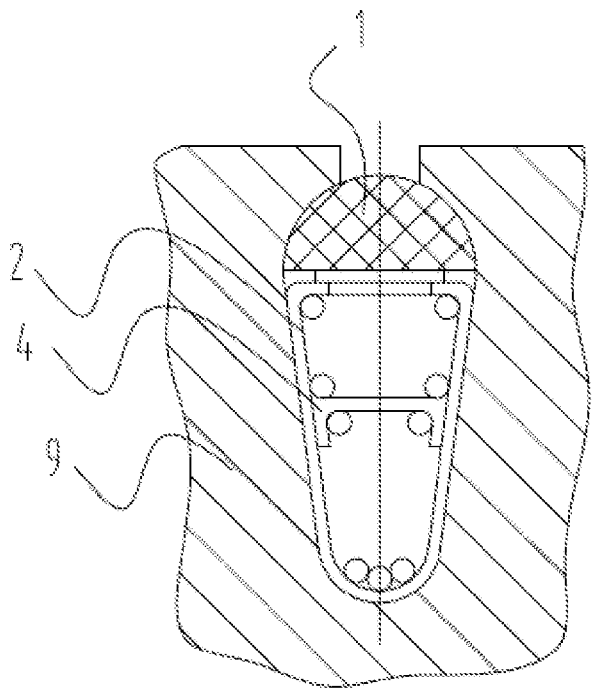
FIG. 1 shows a first insulation structure of an iron core tooth slot in the conventional technology.
Figure 2:
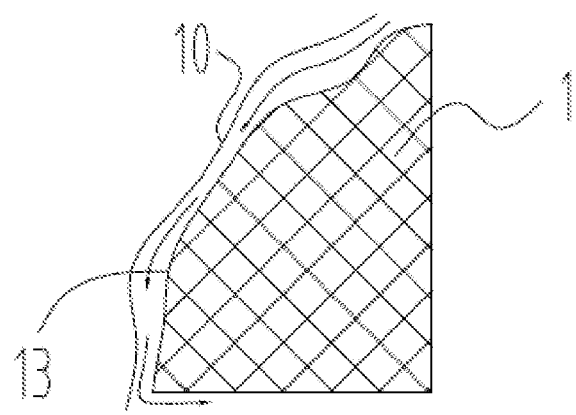
FIG. 2 is a partially enlarged view of a slot wedge part in FIG. 1.
Figure 3:
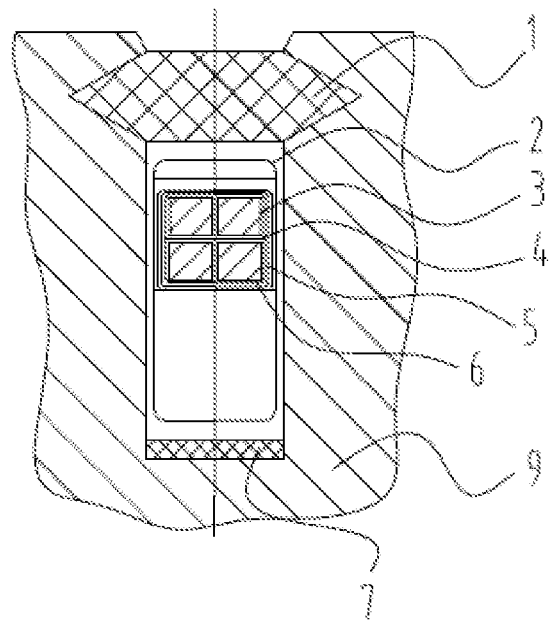
FIG. 3 shows a second insulation structure of the iron core tooth slot in the conventional technology.
Figure 4:
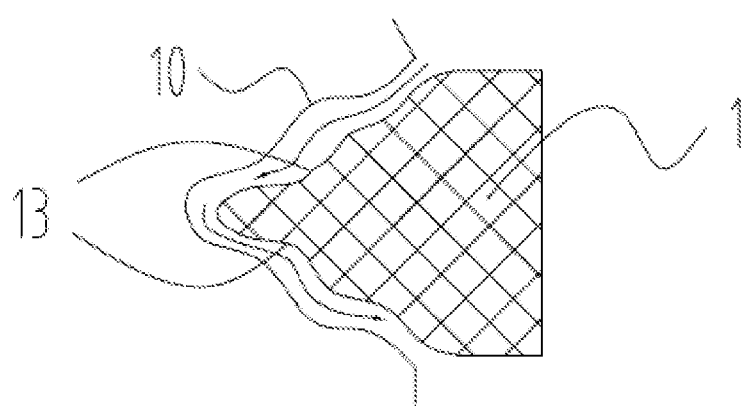
FIG. 4 is a partially enlarged view of a slot wedge part in FIG. 3.

| | |
|---|---|
| 1 slot wedge, | 2 slot insulator, |
| 3 interturn insulator, | 4 interlayer insulator, |
| 5 protection insulator, | 6 grounding insulator, |
| 7 slot bottom filler strip, | 8 thermal expansion material, |
| 9 tooth of iron core, | 10 lateral inner wall of slot opening, |
| 11 bottom inner wall of slot opening, | 12 lateral inner wall of inner slot, |
| 13 lateral outer wall of slot wedge, | 14 bottom outer wall of slot wedge, |
| 16 upper step of bottom inner wall of slot opening, and | |
| 15 lower step of bottom inner wall of slot opening. | |

DETAILED DESCRIPTION

The inventor made in-depth research and analysis to the damage and failure mechanism of the insulation material of the motor slot insulation in a humid environment. Specifically, the inventor made in-depth research to the factors such as a varnish vacuum pressure impregnation process of a motor stator of a wind-driven generator, various environments of the motor material of the wind-driven generator in the processes of operating and using as well as halting of the wind-driven generator, and climate and season alternations. Materials between solid phase framework stacking sheets, wires and a multi-layer insulation material (using a macromolecular material), and materials between insulators in the slot are classified into the property category of porous material. The following physical phenomena are involved for these porous materials: heat conduction inside porous mediums in the materials of the stator and rotor, heat convection in gas and seeping liquid between gaps and, phase change heat transfer of liquid phase water evaporation and gas phase vapor condensation; mass transfer category of mass diffusion in water, vapors, and air (containing salt mist) between porous mediums (material) inside the stator and rotor and the environment; heat generation depending on the wires, causing state change (phase change: liquid phase water evaporation or vapor condensation) of gas (vapors and dry air) between internal materials of the stator; the mass of vapor varies with the phase change when the material is in a heating process, thus causing change of density distribution of vapors between the materials and inside the porous medium material, to form density gradient of vapors (i.e., the driving force for the diffusion); balance between the change of internal moisture content and the relative humidity of the environment (humidity of humid air outside the motor and humidity of humid air inside the air gaps and the porous medium material determine the mass transfer of the vapors inside and outside, that is, the transmission direction of the vapors).

The law of the porous medium (material) when heated proved by experiments shows that: the changes of temperature and humidity due to the season and climate factors may directly lead to change of insulation resistance value. Furthermore, the experimental information, evidence images and data show that: the law of temperature rising of the winding cannot reflect a temperature state of a side distal end iron core which is cooled by natural air between the iron core stacking sheets, and after heat is generated inside the porous material, air pressure in the air gap rises rapidly according to display, however, since leaking approaches of portions inside the porous material are not consistent, the situation of inconsistent dropping speed of the pressure may also occur. Most importantly, the own air gaps and porosity which can be provided inside the materials between the stacking sheets, between the wires and multi-layer insulation material (polymer), and the insulation structure inside the slot for the intervening of the vapors are premises for existing of the above mechanism.

The standards of insulation systems of the conventional thermal power generator and hydroelectric generator are based on the industrial frequency of 50 HZ, electric energy output of the stator of the wind-driven generator is actively rectified by a converter, and seemingly, harmonic waves are inputted into stator coils, the harmonic wave component in the wires, as a harmonic wave internal heat source, may have a heat production rate which is biquadrate of the frequency of the harmonic wave and is far higher than a heat production rate of an industrial frequency heat resource. However, an assessed rate in the heat-expansion and cold-contraction experiment of the macromolecular insulation material under a strong electricity field is not the ease, since the expansion coefficient of the material after being humid changes when being heated again, thus may remind an assessment to a wet expansion property of the insulation material in the insulation system. Furthermore, the infiltration and impregnating properties of the insulation material to water after being subjected to several times of hygrothermal expansion also change. Moreover, after being humid, and heated after being humid, various bubbles may be generated inside the material, and the bubbles are portions where local discharge is apt to occur. The electric conductance of a solid electrolyte is relative to its structure, and the electric conductance of the porous material increases sharply with the increase of the atmosphere humidity, this is because that the moisture in the air respired by a capillary effect is connected to dirt and contaminants, resulting in reduced surface electrical resistance and volume electric resistance (due to the impregnating of the moisture), therefore, for a porous material, the effect of humidity is particularly significant. In addition, for the porous material, the effect of humidity is particularly significant. In addition, poor impregnation in the manufacturing process, or the heat-expansion and cold-contraction and vibration in operation may all cause formation of air gaps between the insulation materials. "Pin holes" generated by a local discharge enable volumes of the air gaps to expand, and further cause the material to be cracked and layered into a "porous structure". Therefore, the moisture, in addition to causing the insulation material to have an increased conductance, allows the alkalescent and acidic substances inside the insulation material to be hydrolyzed, thus, the conductance of the insulation material is further increased. In addition, if a water film is formed on the surface of the insulation structure, the surface leakage conductance may be greatly increased as well.

In addition, the effect of surface tension between the stacking sheets of the motor iron core may enable the liquid film inside the iron core tooth slot to flow along a wall surface between adjacent layers, thus being in communication with a frame of the iron core. The model in which liquid seeping from the inside of the slot along the gap between the iron core stacking sheets by 360 degrees centripetally or radially corresponds to the structure of the gap between the iron core stacking sheets (reference may be made to "The Physics of Flow Through Porous Media", Author: (Austria) A. E. Scheidegger, translated by Wang Hongxun, et al., Published by the Petroleum Industry Press in 1982). As may be known from analysis using the fundamental law of seepage mechanism "Darcy's Law", moisture is more likely to infiltrate the gap between the iron core stacking sheets to expel air outwards (called "Displacement Theory"). Therefore, in the case that a heating temperature of the winding inside the motor for removing moisture is higher than 100 degree Celsius, it needs to restrict crack damage to the insulation material caused by large amount of gasified substances generated inside the motor.

The operation environment of the wind-driven generator or sea oil field operated motor imposes special requirements to the insulation system and materials thereof. The motor winding and the inverter are integrally formed. PWM (pulse width modulation) square wave pulse frequency may reach 4 KHz to 20 KHz, and the high frequency effect makes medium loss, local discharge and space charges aggravate the aging effect of insulation, causing premature failure of the insulation. In the process of manufacturing a motor, though an advanced impregnating technique, for example, vacuum pressure impregnation (VPI) is employed, it is inevitable to generate "bubbles" or "air gaps" in the insulation interface area of the electromagnetic lines. Viewed from electric field strength, the electric field strength in the bubbles is much higher than that in the surrounding mediums, and a breakdown field strength of the gas is much lower than that of liquid or solid, therefore, discharging is apt to occurs in the bubbles first. Discharging may damage the structure of macromolecules to cause splitting, local fusing and chemical degradation, thus generating H (hydrogen) and O (oxygen) to corrode the insulation material to form "micropores". Thermal aging causes "delaminating", "crazing" and deformation of the insulation material by heat-cold cycling. Mechanical aging is caused by reasons such as thermal stress, vibration in operation, thermal cycling etc., and is presented as fatigue, cracks, looseness, abrasion, etc. of the insulation structure. The electromagnetic vibration of the stator winding in a wind field causes the tooth slot, a slot opening and main insulation parts of an end portion to continuously bear alternate mechanical loads, causing local defects or "delaminating" of the insulation structure. Aging caused by environment factors is mainly presented as pollution and corrosion to the insulation structure by dust, oil dirt, salt and other corrosion substances, and surface condensation after the insulation structure is dampened or cooled when the field operation unit has experienced rain for a long time. With the effect of alkali and acid and moisture, while the insulation layer has "wet expansion", "dip expansion" to cause aging, the moisture is gasified or condensed in the thermal cycling process to form larger "gaps". The representation of aging is the reduction of insulation resistance, increase of leakage current and increase of medium loss caused by dampening, deterioration and staining. Increase of local discharge is caused by shelling, peeling off and crazing of the insulation layer, all of these result in degrading of the insulation electric behavior and mechanical behavior, reducing of the residual pressure withstanding level and the service life, and finally damaging of the insulation.

The study results of freezing process of the material belonging to the porous medium in the slot insulation material are presented below. The condensed substance in pores of the porous medium is different from the same kind of substance in a large space, and presents different substance properties, and the fusion point of the substance in the porous medium is different from that of the substance in the large space. Under the action of strong magnetic field of the motor, when water entering the air gaps of the motor is magnetized, a combination state of the water molecules is also varied from long chains to short chains, which allows the water to easily seep into thin gaps between the hard iron core stacking sheets, to facilitate the capillary effect between the stacking sheets, allows the water to more easily seep into the porous insulation material after the varnish vacuum pressure impregnation, and allows the form of the iron core stacking sheet after being rusted to be changed into loose detritus-like substances which have been carried away by the water flow.

In addition, The Chinese National Nano Center measured a contact angle of magnetic treated water on different solid surfaces by an optical video contact angle tester, to observe change state of aggregation and surface tension of the water molecules. After the water is effected by a static magnetic field (in the permanent magnetic wind-driven generator when being deactivated, an effect of the static magnetic field to the water stored in the air gaps exists), on a surface of highly hydrophilic mica material (an electric insulation material), the water fully spreads, and the contact angle is nearly equal to zero, and on a surface of a cooper material (lead), the water more likely infiltrates. In the absorption of the ultraviolet light, it is found that the strength of the spectrum line increases exponentially as the wave length decreases, which indicates that a large amount of clusters, such as, hydrogen bond chains exist in the magnetic treated water. Six absorption peaks are presented in an infrared absorption spectra at a middle infrared region, and when the temperature and magnetic field change, the six absorption peaks always exist, which is consistent with the case of purified water, namely, the property of the six absorption peaks of the magnetic treated water do not change with the changes of the outer magnetic field and temperature. This indicates that, the six peak values represent an inherent property of the water. On an infrared absorption spectra at a near infrared region, shifts of many new peaks and peak frequencies are discovered, the water treated by a strong magnetic field has an obvious saturation effect and a memory effect, which indicates that targets (magnetic units) being effected by a magnetic field actually exist in the water but the number is limited, and which do not change with the external factors. When the electromagnetic field in the motor act, the targets may interact with each other to represent a paramagnetic property. In a scope ranging from 50 degree Celsius to 90 degree Celsius, not only multiple peaks are presented, but also the frequencies and strengths of these peaks change, and when the temperature rises or drops, peculiar effects such as irreversible processes are presented, which again indicates that, lots of clusters exist in the water. When the permanent magnetic motor stops operation, the changes of water viscosity, electric conductivity and contact angle are tested under the effect of the static magnetic field, the test results indicate that, under the effect of static magnetic field, the viscosity of the water decreases with the increase of effect time of the magnetic field. Moreover, the stronger the magnetic field is, the more rapidly the viscosity lowers. The electric conductivity of the water increases with the increase of the effect time of the magnetic field. The contact angle of the water on the surface of the cooper material decreases by about 0.4 degree, and the water infiltrates on the surfaces of the two materials of graphite and cooper more easily, the fundamental reason lies in that the surface tension of the water is reduced due to the changes of the binding and aggregating between the molecules and the enhancement of the polarity after the water is treated by the magnetic field.

Based on the knowledge of the mechanism of insulation of the macromolecular insulation material damaged by seepage in the porous material of the motor in a moisture vibration environment, and also the insulation material of the stator winding of the permanent magnetic motor is subjected to thermal expansion deformation and vibration, the different stresses are subjected by different positions, in the case that the mechanical stress of the material at a certain point (for example, a curving portion) exceeds the strength of chemical bonds, breaking of chemical bonds may occur (for example, cracking of material at the curving portion of a winding nose part), resulting in local discharge on the surface of the polymer (insulation material) and inside the polymer (insulation material), this is another main reason of local aging. Under the action of the electric field, moisture existing in the polymer generates discharge waterborne resins, and the waterborne resins start from the gaps and impurities, the generating and growing of the waterborne resins takes several months to several years, and the growing of the water resins is speeded up as the frequency increases (no waterborne resins are generated at the DC voltage).

The above descriptions are research and analysis to principles of damage and failure of the insulation material of the motor slot insulation made by the inventor, based on these results of research and analysis, technical solutions of the present application are proposed by the inventor. The technical solutions of the present application are further described in detail with specific embodiments. The inventor made in-depth research to the above conventional technology and related theoretical knowledge. The inventor proposes a new solution of the protection structure for developing new functions of the slot wedge, basing on the slot wedge as a "gateway" for protecting the insulation structure in the motor slot, seeking for the insulation protection inside the motor slot and preventing water and moisture from entering, and addressing the issues of varnish loss in a radial direction of the traditional slot wedge after the varnish impregnation, improving a filled degree of the varnish impregnation, reducing the risk of the motor being eroded by moisture, and improving the insulation reliability.

For facilitating the description, taking FIG. 1 (in other drawings, the various directions of the slot wedge have the same definitions) as an example, a left and right directions of FIG. 1 is defined as a width direction of the slot wedge, an up and down directions of FIG. 1 is defined as a thickness direction of the slot wedge, and a direction perpendicular to the paper surface of FIG. 1 is defined as a length direction of the slot wedge.

First Embodiment

In the embodiment of the present application, a slot wedge in the conventional technology is improved, a sealing structure is additionally provided on the basis of the conventional slot wedge, and a motor slot wedge with a sealing structure is put forward. An outer wall of the slot wedge is provided with a groove, and a thermal expansion material is provided in the groove, the thermal expansion material, after expanding with heat, is in contact with an inner wall of an iron core tooth slot. The thermal expansion material is preferably an elastic thermal expansion material, specifically, a thermal expansion glass mat, a thermal expansion rubber, a fiberglass rope, or other soft filling materials etc. may be adopted.

The specific structures of the groove and the expansion material are described in detail in conjunction with the drawings. For facilitating the description, related structures are defined and explained. A portion between teeth 9 of the iron core is named as a tooth slot, and the iron core tooth slot is divided into two parts, one part for embedding a slot wedge is named as a slot opening, and the part except for the slot opening is named as an inner slot, and a coil is embedded in the inner slot. An inner wall of the tooth slot is divided into a lateral inner wall 10 of the slot opening, a bottom inner wall 11 of the slot opening and a lateral inner wall 12 of the inner slot according to different positions where the inner wall is located. An outer wall of the slot wedge is also divided into a lateral outer wall 13 and a bottom outer wall 14 of the slot wedge. As examples, FIGS. 7 to 30 show various improvements made on the basis of conventional slot wedges shown in FIGS. 1 to 6. FIGS. 7 to 10 show an improved solution to the slot wedge in FIGS. 1 and 2, FIGS. 11 to 20 show improved solutions to the slot wedge in FIGS. 3 and 4, and FIGS. 21 to 30 show improved solutions to the slot wedge in FIGS. 5 and 6. It is to be explained that, arrangements of the grooves are all left-right symmetric, and only the structure at one side is shown. In addition, the groove may be plural in number. The grooves (all the grooves or part of the grooves) may extend through the slot wedge in a length direction of the slot wedge, or may have a length smaller than a length of the slot wedge. In a preferred embodiment, the cross section of the groove may have a trapezoidal shape, or a semi-circular shape or other shapes. A bottom of the groove may have a width greater than or equal to a width of an opening of the groove.

Figure 18:
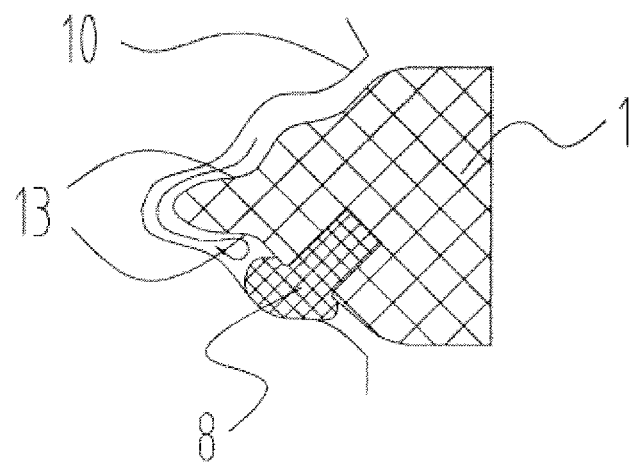
FIG. 18 is a schematic view showing the structure of the fourth improved solution based on the insulation structure in FIG. 3 according to the embodiment of the present application (after the material expands)
Figure 19:
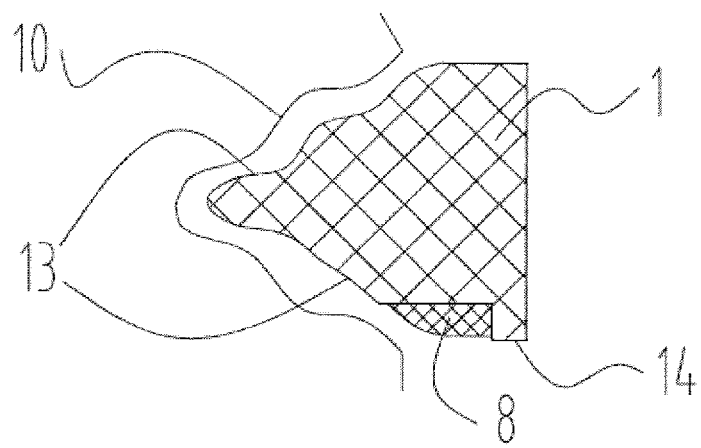
FIG. 19 is a schematic view showing the structure of a fifth improved solution based on the insulation structure in FIG. 3 according to an embodiment of the present application (before the material expands)
Figure 20:
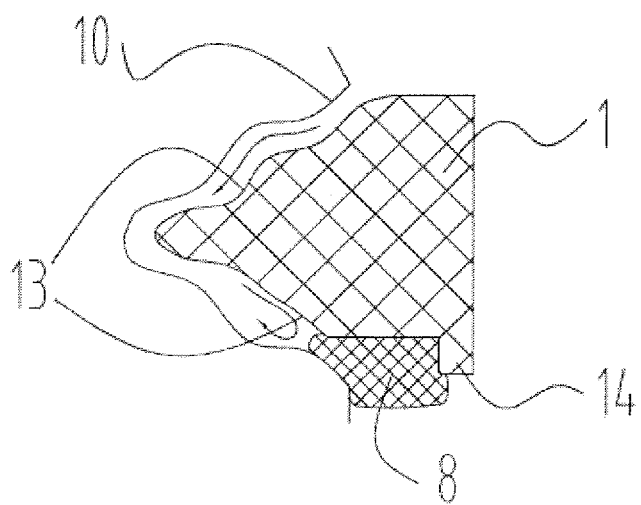
FIG. 20 is a schematic view showing the structure of the fifth improved solution based on the insulation structure in FIG. 3 according to the embodiment of the present application (after the material expands)

Regarding an arranged location of the groove, it may be located in the lateral outer wall 13 of the slot wedge as shown in FIGS. 7 to 18 and 21 to 24, or in the bottom outer wall 14 of the slot wedge as shown in FIGS. 25 to 30, or in a second junction region between the bottom outer wall and the lateral outer wall of the slot wedge as shown in FIG. 19 and 20. The three types of groove locations and corresponding structural deformations are described in detail hereinafter.

1. In the case that the groove is arranged in the lateral out wall 13 of the slot wedge, a grooving manner is preferably as follows.

Figure 7:
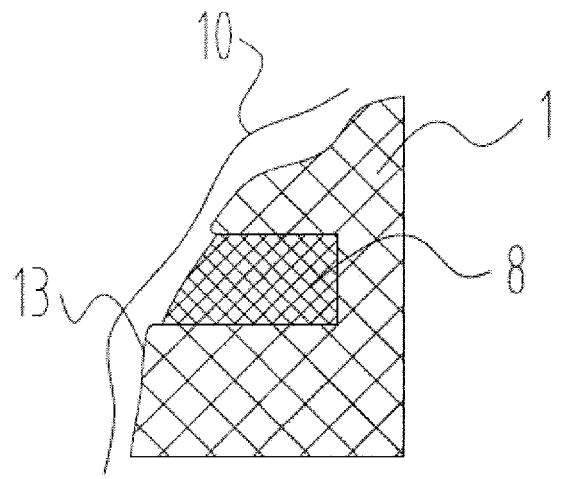
FIG. 7 is a schematic view showing the structure of a first improved solution based on the insulation structure in FIG. 1 according to an embodiment of the present application (before the material expands)
Figure 8:
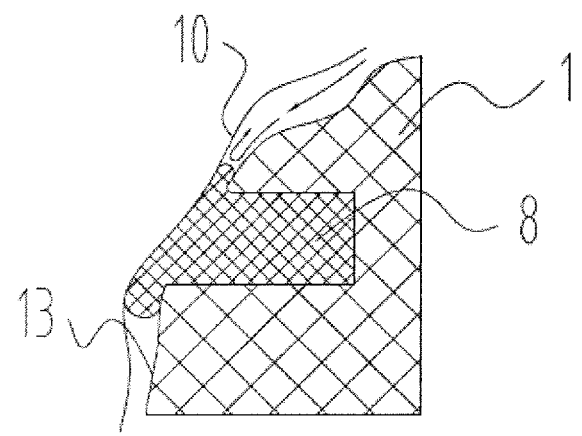
FIG. 8 is a schematic view showing the structure of the first improved solution based on the insulation structure in FIG. 1 according to the embodiment of the present application (after the material expands)
Figure 11:
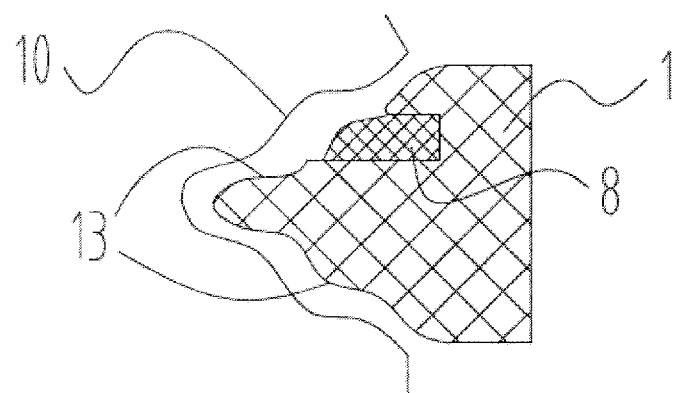
FIG. 11 is a schematic view showing the structure of a first improved solution based on the insulation structure in FIG. 3 according to an embodiment of the present application (before the material expands)
Figure 12:
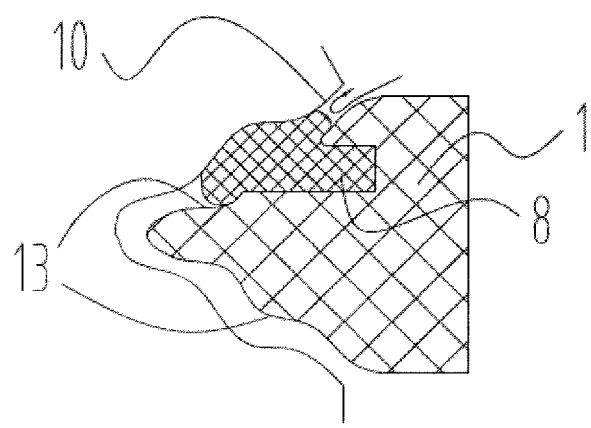
FIG. 12 is a schematic view showing the structure of the first improved solution based on the insulation structure in FIG. 3 according to the embodiment of the present application (after the material expands)
Figure 13:
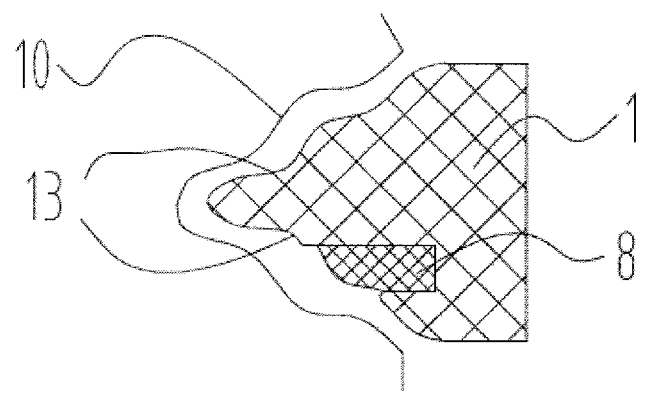
FIG. 13 is a schematic view showing the structure of a second improved solution based on the insulation structure in FIG. 3 according to an embodiment of the present application (before the material expands)
Figure 14:
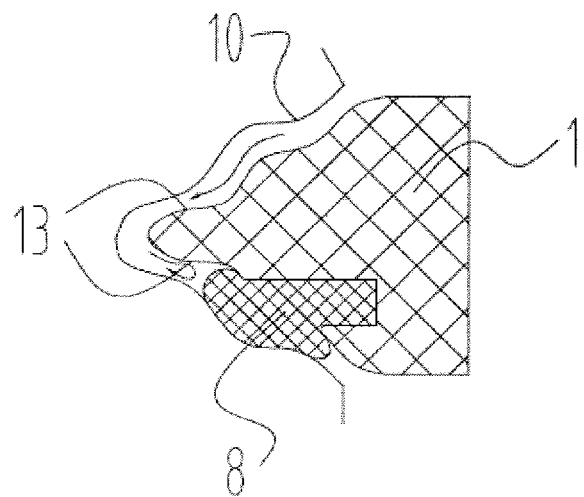
FIG. 14 is a schematic view showing the structure of the second improved solution based on the insulation structure in FIG. 3 according to the embodiment of the present application (after the material expands)
Figure 21:
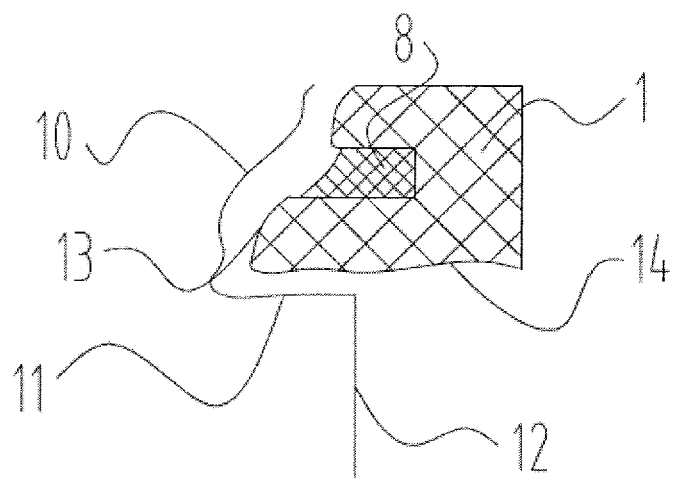
FIG. 21 is a schematic view showing the structure of a first improved solution based on the insulation structure in FIG. 5 according to an embodiment of the present application (before the material expands)
Figure 22:
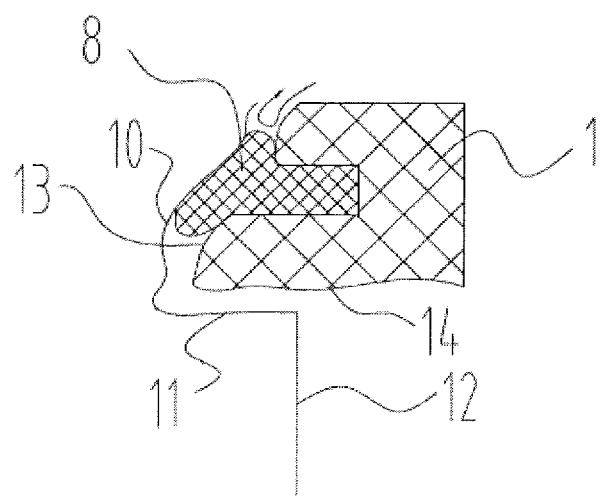
FIG. 22 is a schematic view showing the structure of the first improved solution based on the insulation structure in FIG. 5 according to the embodiment of the present application (after the material expands)

1) A grooving direction of the groove is a width direction of the slot wedge. As shown in FIGS. 7 to 8, as an improvement to the structure of the conventional slot wedge in FIGS. 1 and 2, a groove is provided in the lateral outer wall of the slot wedge 1, and the grooving direction is a direction perpendicular to a radial direction of the iron core, i.e., a horizontal direction viewed from FIGS. 7 and 8. The thermal expansion material, after expanding with heat, may extend along the lateral inner wall of the slot opening of the tooth slot of the iron core and fills a gap between the lateral outer wall of the slot wedge and the lateral inner wall of the slot opening as well as clearances between iron core stacking sheets of the iron core. It may be seen from FIG. 8 that, the thermal expansion material extends along the lateral inner wall of the slot opening, and beyond a width range of the groove, thus increasing a contact area of the slot wedge with the slot opening, filling up a local void in FIG. 2 and forming a tight sealing structure. In addition, the slot wedge is generally composed of laminated sheet, and a fiber direction of the laminated sheet is a direction perpendicular to the radial direction of the iron core, therefore this grooving manner follows the fiber direction of the laminated sheet, and thus has a small influence on the mechanical behavior of the laminated sheet which forms the slot wedge. The grooving manners in FIGS. 11 to 14 are the same as that in FIGS. 7 and 8, and the slot wedge structures in FIGS. 11 to 14 are improved on the basis of the slot wedge structure in FIGS. 3 and 4. The cross section of the slot wedge has a hexagonal shape. Viewed from the cross sectional view of the slot wedge, the groove in FIGS. 11 and 12 is located in a lateral edge of an upper half part of the hexagonal shape, while the groove in FIGS. 13 and 14 is located in a lateral edge of a lower half part of the hexagonal shape. The grooving manner in FIGS. 21 and 22 is also the same as that in FIGS. 7 and 8, and the groove in FIGS. 21 and 22 is simply an improved solution based on the shape of the slot wedge shown in FIGS. 5 and 6, and the cross section of the slot wedge has a trapezoidal shape.

Figure 9:
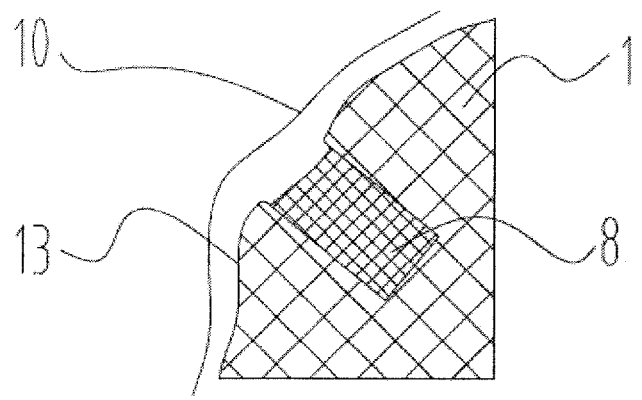
FIG. 9 is a schematic view showing the structure of a second improved solution based on the insulation structure in FIG. 1 according to an embodiment of the present application (before the material expands)
Figure 10:
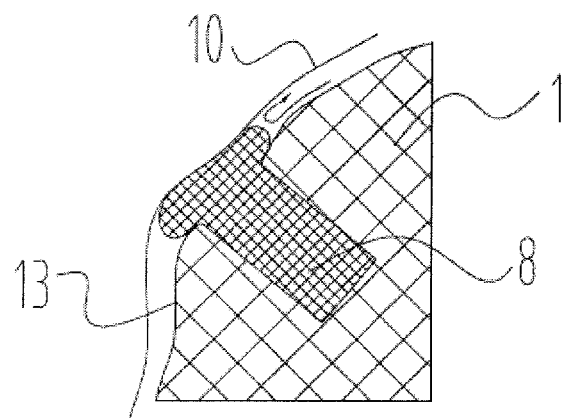
FIG. 10 is a schematic view showing the structure of the second improved solution based on the insulation structure in FIG. 1 according to the embodiment of the present application (after the material expands)
Figure 15:
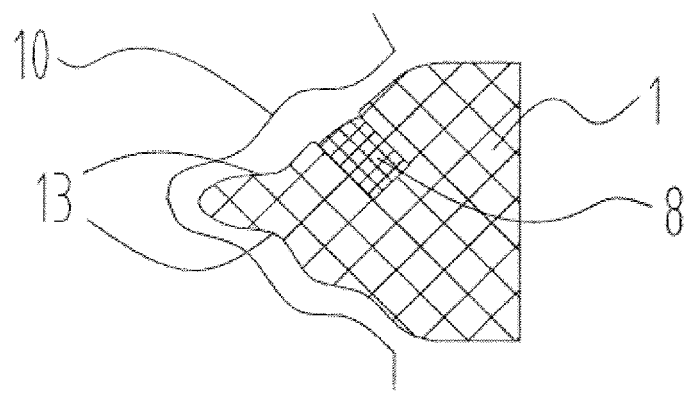
FIG. 15 is a schematic view showing the structure of a third improved solution based on the insulation structure in FIG. 3 according to an embodiment of the present application (before the material expands)
Figure 16:
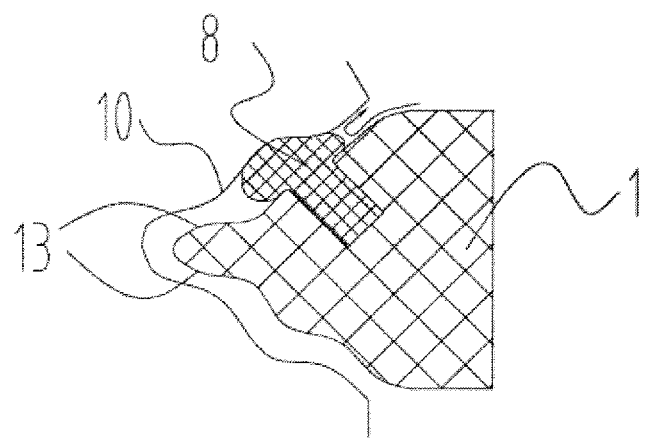
FIG. 16 is a schematic view showing the structure of the third improved solution based on the insulation structure in FIG. 3 according to the embodiment of the present application (after the material expands)
Figure 17:
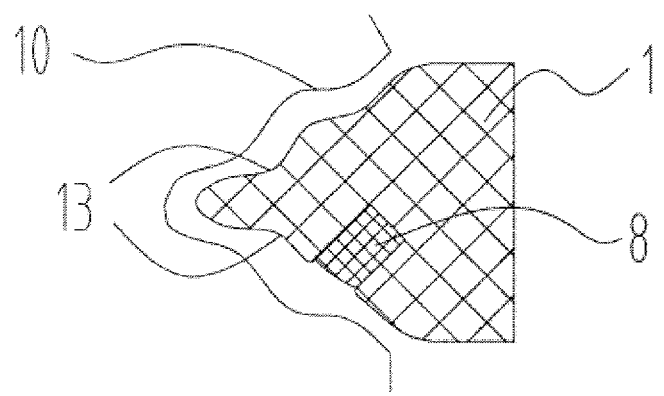
FIG. 17 is a schematic view showing the structure of a fourth improved solution based on the insulation structure in FIG. 3 according to an embodiment of the present application (before the material expands)
Figure 23:
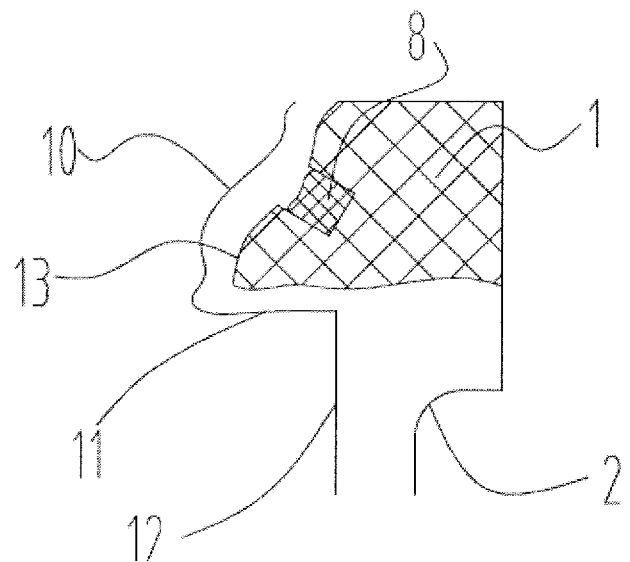
FIG. 23 is a schematic view showing the structure of a second improved solution based on the insulation structure in FIG. 5 according to an embodiment of the present application (before the material expands)
Figure 24:
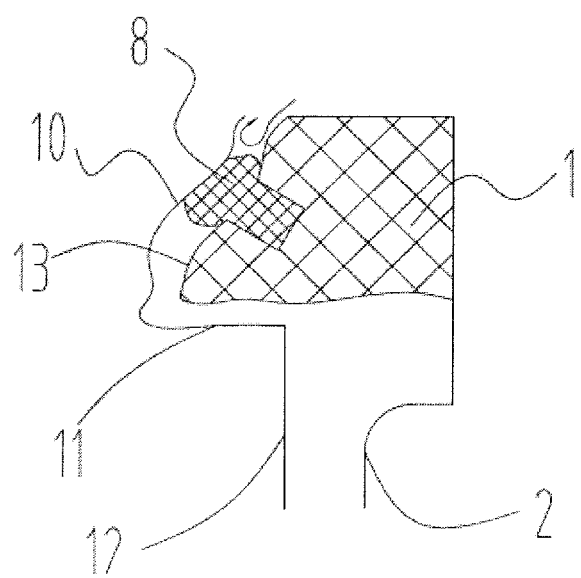
FIG. 24 is a schematic view showing the structure of the second improved solution based on the insulation structure in FIG. 5 according to the embodiment of the present application (after the material expands)

2) The grooving direction of the groove is a direction perpendicular to the lateral inner wall of the slot opening of the tooth slot of the iron core. As shown in FIGS. 9 to 10, as an improvement to the structure of the conventional slot sedge in FIGS. 1 and 2, it is different from the solution in FIGS. 7 and 8 in that, the grooving direction is a direction perpendicular to the lateral inner wall of the slot opening of the iron core tooth slot, namely, an obliquely upward direction when viewed from FIGS. 9 and 10. The grooving direction in FIGS. 9 and 10 is at a certain angel with respect to the fiber direction of the laminated sheet forming the slot wedge, which, compared with the grooving direction in FIGS. 7 and 8, may have a certain adverse effect on the mechanical behavior of the laminated sheet of the slot wedge, however, since the grooving direction is perpendicular to the lateral inner wall of the slot opening, the thermal expansion material may have a better compaction degree to the interface. The grooving manners of FIGS. 15 to 18 are the same as that in FIGS. 9 and 10, and are simply improvements based on the slot wedge shown in FIGS. 3 and 4. The groove in FIGS. 15 and 16 are located in a lateral edge of an upper half part of the hexagonal shape, and the groove in FIGS. 17 and 18 is located in a lateral edge of a lower half part of the hexagonal shape. The grooving manner in FIGS. 23 and 24 is the same as that in FIGS. 9 and 10, and is simply an improvement based on the shape of the slot wedge shown in FIGS. 5 and 6.

Figure 25:
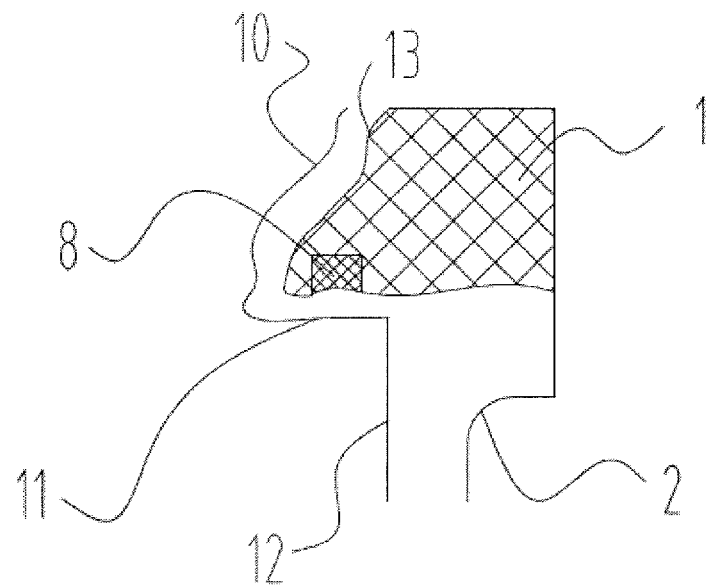
FIG. 25 is a schematic view showing the structure of a third improved solution based on the insulation structure in FIG. 5 according to an embodiment of the present application (before the material expands)
Figure 26:
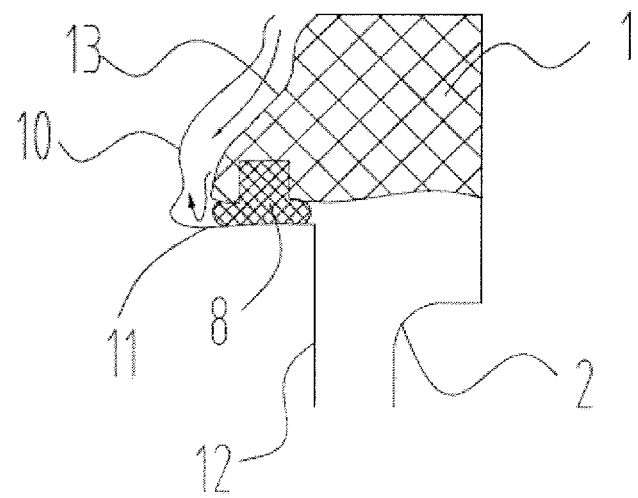
FIG. 26 is a schematic view showing the structure of the third improved solution based on the insulation structure in FIG. 5 according to the embodiment of the present application (after the material expands)

2. In the case that the groove is arranged in the bottom outer wall 14 of the slot wedge, the grooving manner is preferably as follows:

1) The groove is arranged in the bottom outer wall of the slot wedge at a position corresponding to the bottom inner wall of the slot opening of the tooth slot of the iron core. As shown in FIGS. 25 and 26, as an improvement to the conventional slot wedge in FIGS. 5 and 6, the groove is arranged in the bottom outer wall of the slot wedge at a position corresponding to the bottom inner wall of the slot opening of the iron core tooth slot. As shown in FIG. 26, the thermal expansion material, after expanding with heat, can extend along the bottom inner wall of the slot opening of the iron core tooth slot, to fill a gap between the bottom outer wall of the slot wedge and the bottom inner wall of the slot opening.

Figure 27:
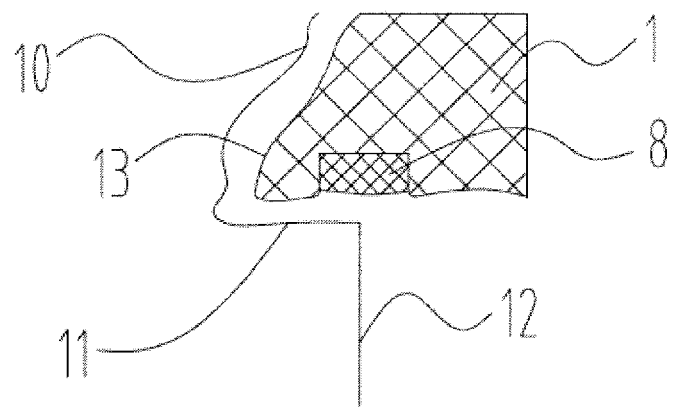
FIG. 27 is a schematic view showing the structure of a fourth improved solution based on the insulation structure in FIG. 5 according to an embodiment of the present application (before the material expands)
Figure 28:
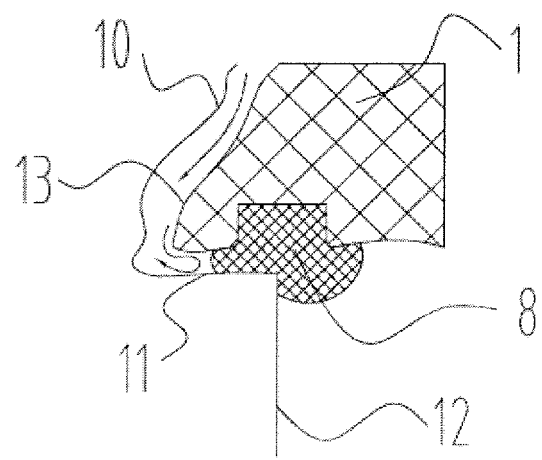
FIG. 28 is a schematic view showing the structure of the fourth improved solution based on the insulation structure in FIG. 5 according to the embodiment of the present application (after the material expands)

2) The groove is arranged in the bottom outer wall of the slot wedge at a position corresponding to a first junction region between the bottom inner wall of the slot opening of the iron core tooth slot and the lateral inner wall of the inner slot of the iron core tooth slot. As shown in FIGS. 27 and 28, as improvement of the slot wedge shown in FIGS. 5 and 6, the groove is arranged in the bottom outer wall 14 of the slot wedge, and a specific position is corresponding to the above first junction region of the inner wall of the iron core tooth slot, and its grooving direction is perpendicular to the bottom inner wall of the slot opening of the iron core tooth slot. As shown in FIG. 28, the thermal expansion material, after expanding with heat, can extend along the bottom inner wall of the slot opening of the iron core tooth slot and the lateral inner wall of the inner slot of the iron core tooth slot, to fill a gap between the bottom outer wall of the slot wedge, a portion, near the first junction region, of the inner wall of the iron core tooth slot, and the slot insulator.

Figure 29:
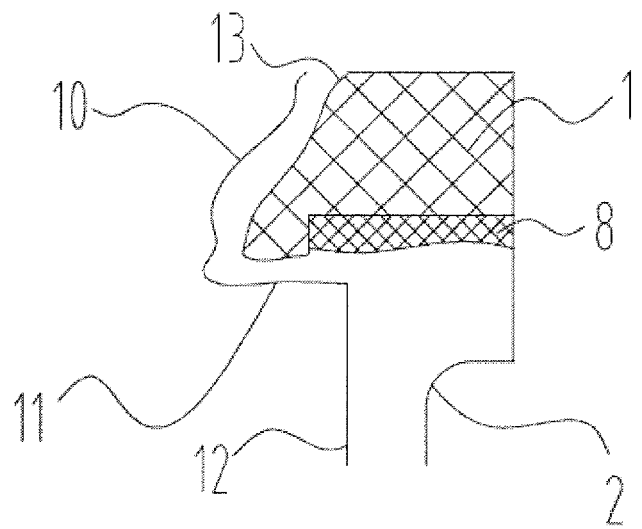
FIG. 29 is a schematic view showing the structure of a fifth improved solution based on the insulation structure in FIG. 5 according to an embodiment of the present application (before the material expands)
Figure 30:
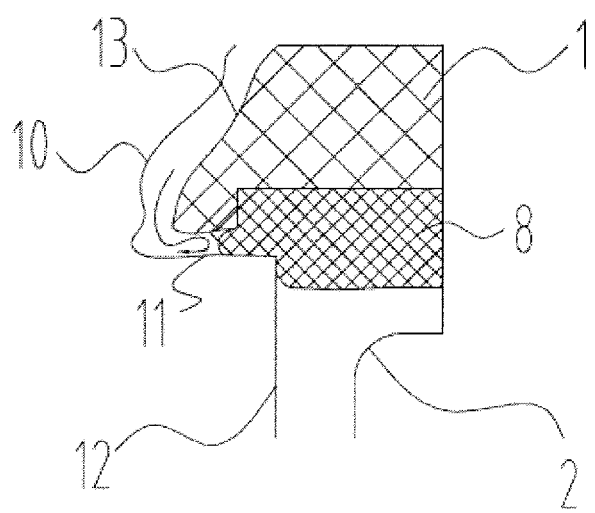
FIG. 30 is a schematic view showing the structure of the fifth improved solution based on the insulation structure in FIG. 5 according to the embodiment of the present application (after the material expands)

3) The groove crosses the bottom inner wall of the slot opening of the iron core tooth slot and the slot insulator in the width direction, preferably, a width of the groove crosses most part of the inner wall of the bottom of the slot opening of the iron core tooth slot and the slot insulator. As shown in FIGS. 29 and 30, as an improvement to the slot wedge in FIGS. 5 and 6, the groove is arranged in the bottom outer wall 14 of the slot wedge. Since the groove has a large width, and crosses the bottom inner wall of the slot opening of the iron core tooth slot and the slot insulator, as shown in FIG. 30, the thermal expansion material, after expanding with heat, can extend along the bottom inner wall of the slot opening of the iron core tooth slot, the lateral inner wall of the inner slot of the iron core tooth slot, and the slot insulator, to fill a gap between the bottom outer wall of the slot wedge and the bottom inner wall of the slot opening of the iron core tooth slot, a gap between the bottom outer wall of the slot wedge and the slot insulator, and a gap between the slot insulator and the lateral inner wall of the inner slot.

3. The groove is provided at a second junction region between the bottom outer wall and the lateral outer wall of the slot wedge. As shown in FIGS. 19 and 20, as an improvement to the slot wedge in FIGS. 3 and 4, the location for arranging the slot is at the above second junction region, in FIGS. 19 and 20, the slot wedge has a hexagonal shaped cross section, and the grooving position is actually at the first junction region between a lateral edge and a bottom edge of the hexagonal shape (in the embodiment according to the present application, it is regarded as opening the groove in the bottom outer wall of the slot wedge), the shape of its groove is slightly different from the shapes of the grooves in other drawings, and the cross section of the groove has a shape similar to an angle of a rectangular shape. The groove is just corresponding to a third junction region between the lateral inner wall of the slot opening of the iron core tooth slot and the lateral inner wall of the inner slot of the iron core tooth slot, and its grooving direction also faces towards the third junction region. As shown in FIG. 20, the thermal expansion material, after expanding with heat, can extend along the lateral inner wall of the slot opening of the iron core tooth slot and the lateral inner wall of the inner slot of the iron core tooth slot, to fill a gap between a portion, corresponding to the third junction region, of the inner wall of the iron core tooth slot, a portion, near the second junction region, of the outer wall of the slot wedge, and the slot insulator.

Through the detail description of the slot wedge structure according to an embodiment of the present application, the embodiments of the present application have the following technical effects.

1) In the above technical solution, the groove is simply formed in a part of a conventional slot wedge without changing the overall structure of the slot wedge, thus the elasticity and sealing performance of the adhering layer between the slot wedge and the iron core tooth slot are increased without changing the bearing mechanical behavior of the conventional slot wedge (for example, the resin phenolic glass cloth laminate). The elastic thermal expansion material can extend after contacting the inner wall of the iron core tooth slot to contact with clearances between concave and convex surface and the iron core stacking sheets in the inner wall of the iron core tooth slot to be "rooted", thus the adhering interface is not apt to break. Part of the adhering interface of the conventional slot wedge is changed from a smooth surface to the local thermal expansion material, which facilitates the insulation varnish and the adhesive to form a reliable elastic adhesive layer with the local thermal expansion material. With the elastic adhesive layer, a sheet shaped adhesive layer between the conventional slot wedge and the inner wall of the iron core tooth slot is changed into a "T" shaped expansion adhesive layer or an oblique "T" shaped expansion adhesive layer. With the local "T" shaped or the oblique "T" shaped expansion adhesive layer, a breaking probability of the adhesive layer caused by the shearing stress at the contact part may be reduced compared with the conventional sheet shaped adhesive layer. A transverse part at the head of the "T" shape represents a clearance in the radial direction of the iron core, corresponding to a contact surface between a conventional slot wedge and the slot opening of the iron core tooth slot, and a vertical part of the "T" shape represents the groove which is opened in the conventional slot wedge locally.

2) With this kind of "T" shaped or the oblique "T" shaped expansion adhesive layer structure, the issue of varnish loss in a radial direction of the conventional slot wedge after varnish impregnation may be addressed, thus may improve a filled degree of the varnish impregnation, reduce the risk of the motor being dampened and corroded by moisture, and improve the reliability of insulation.

3) The grooving does not require to increase or excessively increase the thickness of the conventional slot wedge in a radial direction of the motor, thus not only a seal between the slot wedge and the inner wall of the iron core tooth slot can be formed, but also a seal can be formed by the elastic expansion material filled with the insulation varnish (adhesive) in the junction region between the inner wall of the iron core tooth slot, the outer wall of the slot wedge and the slot insulator, thus preventing water and moisture from entering the slot to damage the insulation. By providing the insulation layer having the elastic thermal expansion material at the junction region of the inner wall of the iron core tooth slot, the outer wall of the slot wedge and the slot insulator, a portion, in a depth direction, of the iron core tooth slot and a portion, in a width direction, of the slot are connected integrally, to cover the insulation structure inside the slot, thus adding a second "prevention measure" to an original sealing system, such a double-layer system greatly strengthens the waterproof and moisture-proof capabilities of the insulation structure in the slot and can effectively prevent the varnish loss in radial direction after the varnish impregnation.

Furthermore, on the basis of this embodiment, a subject according to an embodiment of the present application may also be a combination structure of a motor iron core and a slot wedge having a sealing structure, the combination structure includes a motor iron core having an iron core tooth slot and the motor slot wedges of various types as described above.

Second Embodiment

Figure 5:
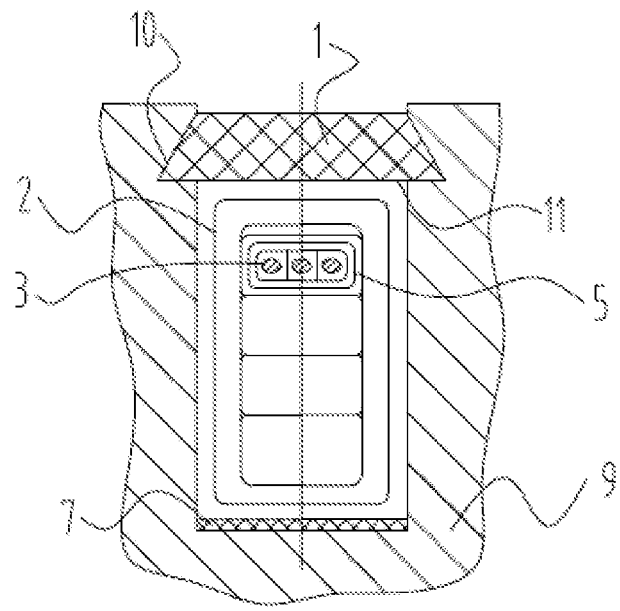
FIG. 5 shows a third insulation structure of the iron core tooth slot in the conventional technology.
Figure 6:
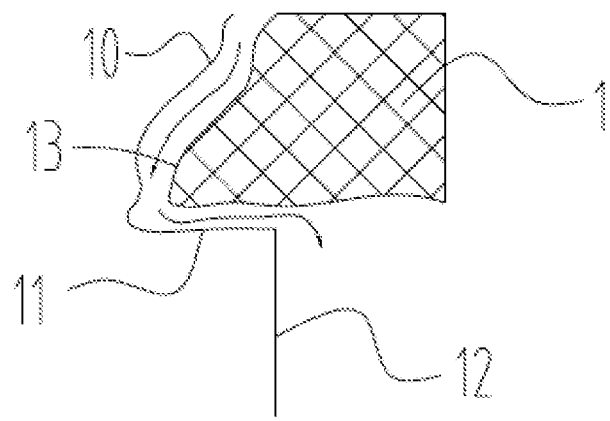
FIG. 6 is a partially enlarged view of a slot wedge part in FIG. 5.
Figure 31:
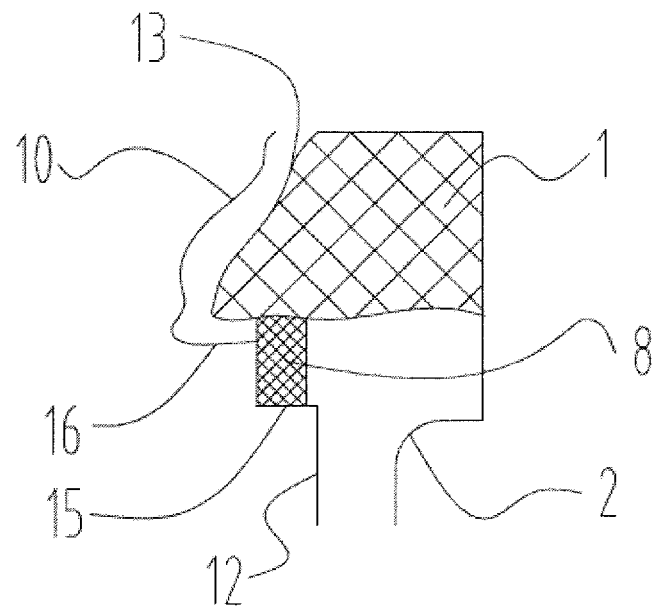
FIG. 31 is a schematic view showing the structure of a sixth improved solution based on the insulation structure in FIG. 5 according to an embodiment of the present application (before the material expands)
Figure 32:
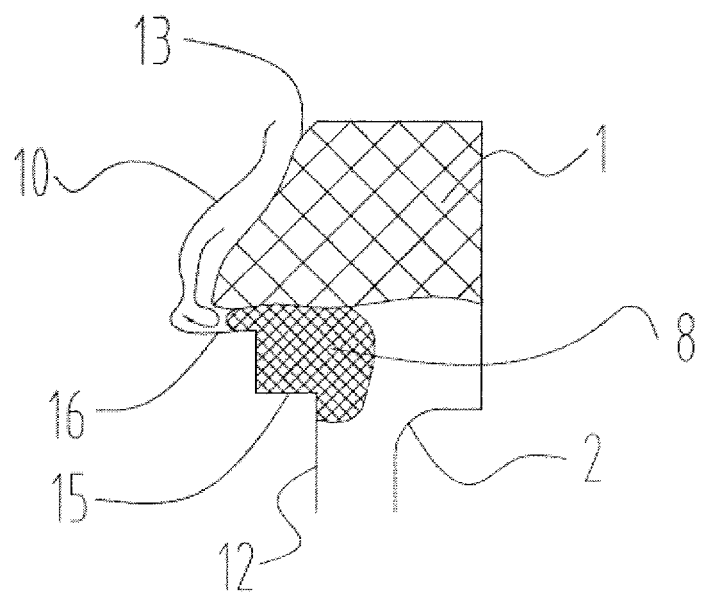
FIG. 32 is a schematic view showing the structure of the sixth improved solution based on the insulation structure in FIG. 5 according to the embodiment of the present application (after the material expands)

The technical solution according to this embodiment is a motor iron core having a sealing structure, as shown in FIGS. 31 and 32, as an improvement to the conventional iron core structure shown in FIGS. 5 and 6, this embodiment is different from the first embodiment in that, the thermal expansion material is not arranged in the groove of the slot wedge, but is directly arranged at the slot opening of the iron core tooth slot. In this embodiment, a bottom inner watt of the slot opening of the iron core tooth slot has a step shape (which is different from the conventional technology), the thermal expansion material abuts against a surface of a lower step, the expansion material has a thickness greater than a height difference between the lower step and an upper step. As shown in FIG. 32, the thermal expansion material, after expanding with heat, extends along a surface of the upper step to fill a gap between the surface of the upper step and the bottom lateral surface of the slot wedge.

Figure 33:
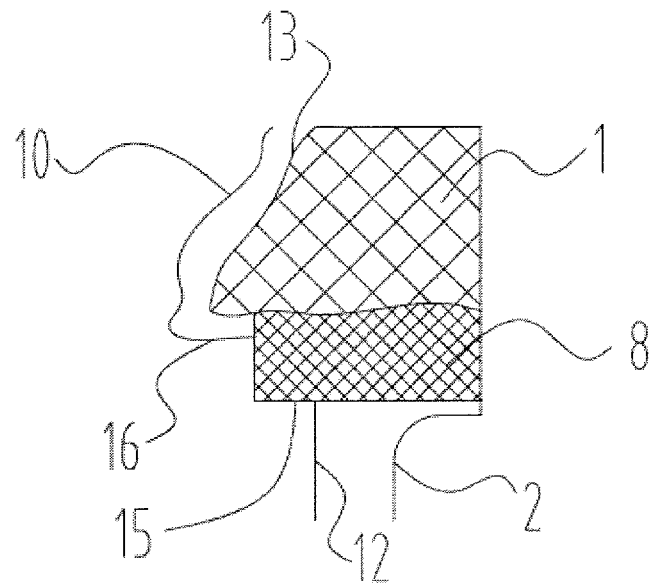
FIG. 33 is a schematic view showing the structure of a seventh improved solution based on the insulation structure in FIG. 5 according to an embodiment of the present application (before the material expands)
Figure 34:
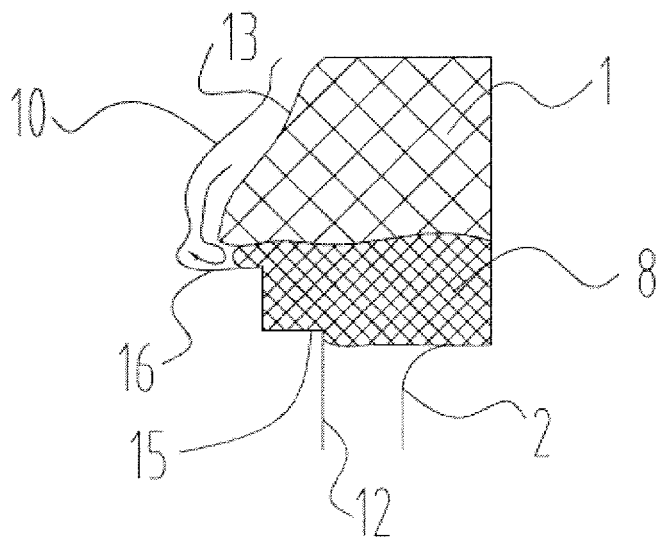
FIG. 34 is a schematic view showing the structure of the seventh improved solution based on the insulation structure in FIG. 5 according to the embodiment of the present application (after the material expands).

As a further variation of this embodiment, as shown in FIGS. 33 and 34, the thermal expansion material has a width crossing the lower step and the slot insulator. In this way, as shown in FIG. 34, the thermal expansion material, after expanding with heat, extends along the surface of the upper step to fill a gap between the surface of the upper step and the bottom lateral surface of the slot wedge, and the thermal expansion material also extends towards the inner slot of the iron core tooth slot to fill a gap between the bottom outer wall of the slot wedge, and the slot insulator, and a gap between the slot insulator and the lateral inner wall of the inner slot and the slot insulator.

In addition to having the technical effects of the first embodiment, this embodiment further skillfully utilizes the step structure of the bottom inner wall of the slot opening of the iron core tooth slot to receive the thermal expansion material, thus allowing the thermal expansion material, after expanding with heat, to be more closely adhered to the iron core tooth slot, and integrally connecting the portion in the depth direction of the iron core tooth slot and the portion in the width direction of the iron core tooth slot to cover the insulation structure in the slot, thereby further strengthening the waterproof and moisture-proof capabilities of the insulation structure in the slot, effectively preventing the varnish loss in the radial direction after varnish impregnation.

Furthermore, on the basis of this embodiment, a subject of an embodiment of the present application may further be a combination structure of a motor iron core and a slot wedge having a sealing structure, the combination structure includes a motor iron core having an iron core tooth slot and the motor slot wedges of various kinds as described above.

The embodiments described hereinabove are only preferred embodiments of the present application, and the scope of the present application is not limited thereto. Any variations or substitutions easily conceived by the person skilled in the art within the technical scope disclosed in the present application should be covered in the scope of the present application. Therefore, the scope of the present application should be defined by the scope of the claims.

The invention claimed is:

1. A motor slot wedge having a sealing structure, wherein a groove is provided in an outer wall of the slot wedge, a thermal expansion material is provided in the groove, and the thermal expansion material, after expanding with heat, is in contact with an inner wall of an iron core tooth slot and partially fills a gap between the slot wedge and the iron core tooth slot as well as clearances between iron core stacking sheets; wherein the thermal expansion material is an elastic thermal expansion material, including a thermal expansion glass mat, a thermal expansion rubber, a fiberglass rope or other thermal expansion soft filling materials;

wherein a film of insulation varnish is formed between the slot wedge and the iron core stacking sheets at a slot opening of the iron core tooth slot in a vacuum pressure impregnation process;

wherein an elastic adhesive layer is formed by the film of insulation varnish and the expanded thermal expansion material;

wherein the slot wedge is composed of laminated sheets;

wherein a cross section of the groove has a trapezoidal shape, and a bottom of the groove has a width greater than a width of an opening of the groove.

2. The motor slot wedge according to claim 1, wherein the groove is arranged in a lateral outer wall of the slot wedge.

3. The motor slot wedge according to claim 2, wherein a grooving direction of the groove is a width direction of the slot wedge.

4. The motor slot wedge according to claim 2, wherein a grooving direction of the groove is a direction perpendicular to a lateral inner wall of a slot opening of the iron core tooth slot.

5. The motor slot wedge according to claim 2, wherein the thermal expansion material, after expanding with heat, is extendable along a lateral inner wall of the slot opening of the iron core tooth slot and fills a gap between the lateral outer wall of the slot wedge and the lateral inner wall of the slot opening of the iron core tooth slot as well as clearances between iron core stacking sheets of the iron core.

6. The motor slot wedge according to claim 1, wherein, the groove is arranged in a bottom outer wall of the slot wedge.

7. The motor slot wedge according to claim 6, wherein the groove is arranged in the bottom outer wall of the slot wedge at a position corresponding to a bottom inner wall of the slot opening of the iron core tooth slot.

8. The motor slot wedge according to claim 7, wherein, the thermal expansion material, after expanding with heat, is extendable along the bottom inner wall of the slot opening of the iron core tooth slot and fills a gap between the bottom outer wall of the slot wedge and the bottom inner wall of the slot opening of the iron core tooth slot.

9. The motor slot wedge according to claim 6, wherein the groove is arranged in the bottom outer wall of the slot wedge at a position corresponding to a first junction region between a bottom inner wall of the slot opening of the iron core tooth slot and a lateral inner wall of an inner slot of the iron core tooth slot.

10. The motor slot wedge according to claim 9, wherein, the thermal expansion material, after expanding with heat, is extendable along both the bottom inner wall of the slot opening of the iron core tooth slot and the lateral inner wall of the inner slot of the iron core tooth slot, and fills a gap between the bottom outer wall of the slot wedge, the inner wall of the iron core tooth slot near the first junction region, and a slot insulator.

11. The motor slot wedge according to claim 6, wherein the groove crosses, in a width direction, a bottom inner wall of the slot opening of the iron core tooth slot and a slot insulator.

12. The motor slot wedge according to claim 11, wherein the thermal expansion material, after expanding with heat, is extendable along the bottom inner wall of the slot opening of the iron core tooth slot, a lateral inner wall of an inner slot of the iron core tooth slot and the slot insulator, and fills a gap between the bottom outer wall of the slot wedge and a bottom inner wall of the slot opening of the iron core tooth slot, a gap between the bottom outer wall of the slot wedge and the slot insulator, and a gap between the slot insulator and the lateral inner wall of the inner slot of the iron core tooth slot.

13. The motor slot wedge according to claim 1, wherein the groove is arranged at a second junction region between a bottom outer wall and a lateral outer wall of the slot wedge.

14. The motor slot wedge according to claim 13, wherein the thermal expansion material, after expanding with heat, is extendable along a lateral inner wall of the slot opening of the iron core tooth slot and a lateral inner wall of an inner slot of the iron core tooth slot, and fills a gap between a portion, at a third junction region, of the inner wall of the iron core tooth slot, a portion, near the second junction region, of an outer wall of the slot wedge, and a slot insulator, the third junction region is a region where the lateral inner wall of the slot opening of the iron core tooth slot and the lateral inner wall of the inner slot of the iron core tooth slot are joined.

15. The motor slot wedge according to claim 1, wherein a cross section of the slot wedge has a sector shape, or a trapezoidal shape, or a hexagonal shape.

16. The motor slot wedge according to claim 15, wherein the cross section of the slot wedge has a hexagonal shape, in a cross sectional view of the slot wedge, the groove is located in a lateral edge of an upper half part of the hexagonal shape or in a lateral edge of a lower half part of the hexagonal shape.

17. A combination structure of a motor slot wedge having a sealing structure and a motor iron core, the combination structure comprising a motor iron core having an iron core tooth slot and the motor slot wedge having a sealing structure according to claim 1.

* * * * *